Nov. 18, 1941.                J. A. HANLEY                2,263,334
                            MOTOR TESTING DEVICE
                            Filed Nov. 24, 1939
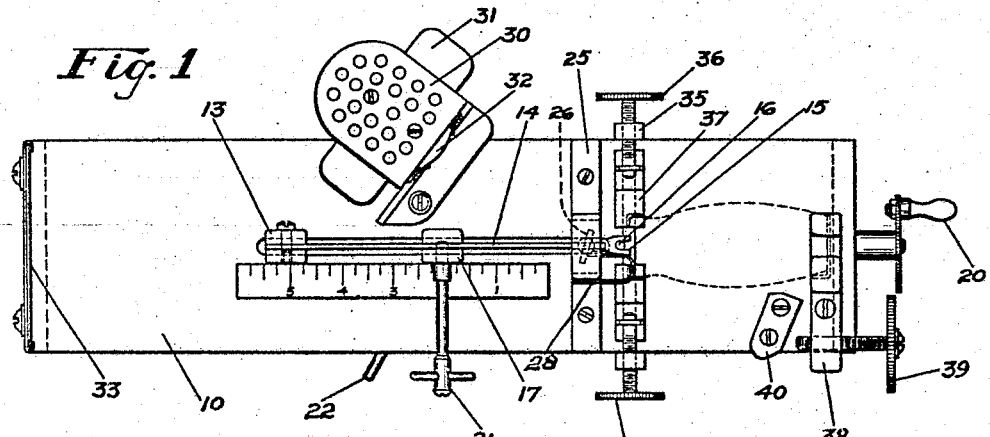
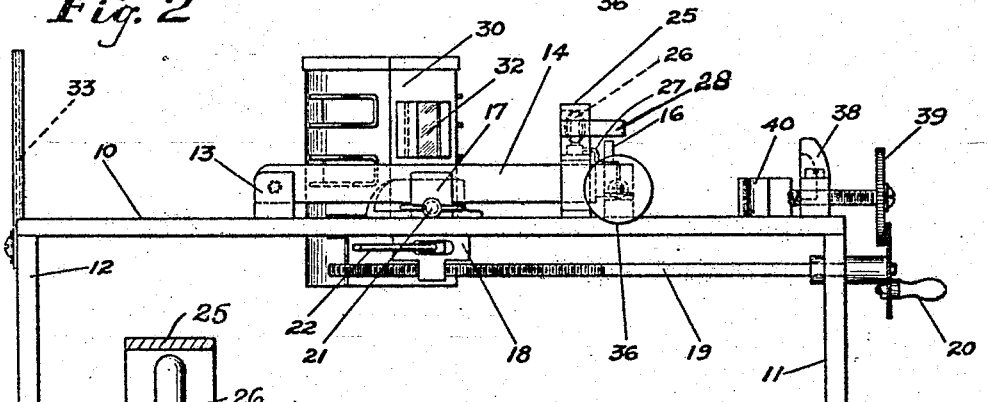
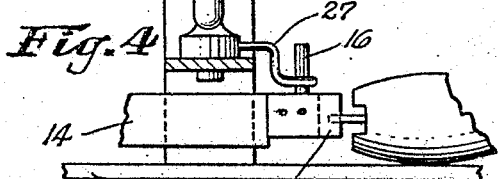
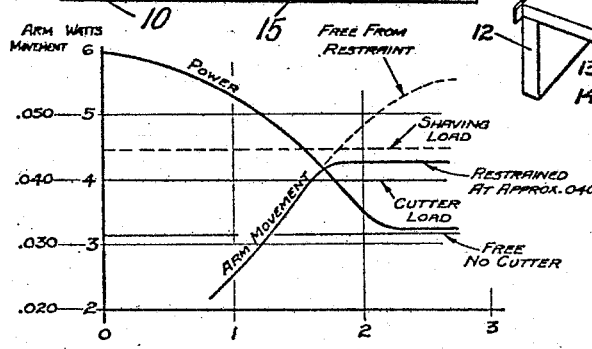
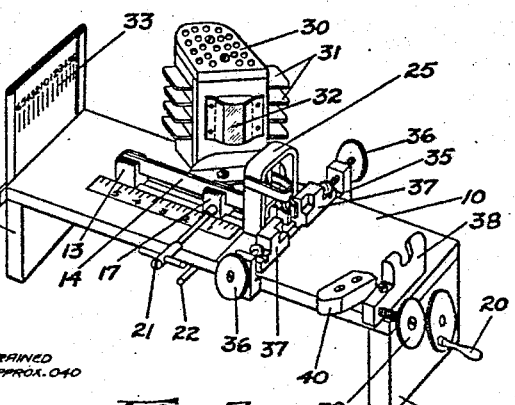
INVENTOR
John A. Hanley
BY
ATTORNEY

UNITED STATES PATENT OFFICE 2,263,334

MOTOR TESTING DEVICE

John A. Hanley, Noroton, Conn., assignor to Gillette Safety Razor Company, Boston, Mass., a corporation of Delaware Application November 24, 1939, Serial No. 305,878

7 Claims. (Cl. 73—51)

This invention consists in a device for testing or analyzing the power characteristics of vibratory electric motors, such for example as those employed in dry shaving implements or in any other apparatus where high speed vibratory action and moderate power requirements are involved. Heretofore the testing of vibratory motors has been a laboratory matter requiring special apparatus and the oversight of a skilled technician and while complete data may be secured in this manner it is inconvenient to rely upon such procedure for obtaining a combination of characteristics at one time and to check or control commercial production.

The principal object of the present invention is to provide a simple and accurate device by which the performance of a vibrating motor may be accurately and easily tested over a wide field of selected loads. To this end, an important feature of the invention consists in a testing device having a vibratory reed adapted to be connected to the driven member of a motor to be tested, a scale and means for indicating on the scale the amplitude, or a multiplied amplitude, of reed vibration. As herein shown, the reed may comprise a bar or strip of flexible tempered steel arranged to vibrate in a path of varying amplitude and having provision for direct connection with the driven member or armature of the motor so that the vibration of the latter is impressed upon the reed. The amplitude of reed vibration is under these conditions a measure of the output of the motor being tested. A scale and indicating means are provided for visually and clearly indicating the amplitude of reed vibration and, as already intimated, this indication may be conveniently multiplied in proportion to the actual displacement of the vibrating end of the reed. Any desired mechanical, electrical or optical means may be employed for indicating reed vibration. As herein shown improved optical means are employed for this purpose and specifically this may include a mirror arranged to be oscillated by connection with the free end of the reed, being located so as to receive a beam from a stationary light source and reflect it to a scale disposed conveniently in the operator's range of visions.

Another feature of the invention consists in a mechanical arrangement for oscillating the mirror and the vibrating reed constructed and arranged to impart a greater angular displacement to the mirror than that of the reed. As a result of this construction it is possible to indicate upon the scale a luminous band perhaps one inch long corresponding to a reed vibration which is hardly detectable to the naked eye.

Another important feature of the invention consists in provision for adjustably varying the length of the vibrating portion of the reed and thereby adjustably regulating the load on the motor being tested. For example, a relatively heavy load may be placed on the motor by substantially reducing the length of the vibrating portion of the reed and thus making it substantially stiffer. In this way the performance of the motor under various loads may be ascertained and compared to a previously adopted standard or to the comparable performance of other motors.

These and other features of the invention will be best understood and appreciated from the following description of a preferred embodiment thereof, selected for purposes of illustration and shown in the accompanying drawing, in which:

Fig. 1 is a plan view of the device;

Fig. 2 is a corresponding view in elevation;

Fig. 3 is a view in perspective of the device on a more reduced scale;

Fig. 4 is a fragmentary view of the connection between the reed and motor, showing also a portion of the adjacent bracket; and Fig. 5 is a diagrammatic representation of curves plotted to indicate data derived by using the testing device.

The device as herein shown includes a rectangular bed plate 10 supported at its ends by panels 11 and 12. Projecting from the surface of the bed plate is a pair of ears 13 between which is clamped one end of a long flexible reed 14. The reed is spaced from the surface of the bed plate 10 and is symmetrically disposed with respect to its main axis and located above a longitudinal slot formed therein. The reed herein shown comprises a thin bar of tempered steel and it is provided at its free end with a forked head 15 from which projects an upstanding pin 16. A slidable carriage 18 is arranged for movement in the slot beneath the reed 14 and is provided with a pair of clamping jaws 17 which embrace the side surfaces of the reed. The carriage is threaded below the bed plate to receive a longitudinally disposed feed screw 19 journaled in its outer end in the panel 11 and provided with a crank handle 20 by which it may be rotated to move the carriage 18 toward or from the stationary end of the reed 14. The clamping jaws 17 may be closed by a transverse screw 21 and thus engaged with the reed at any selected point so as to serve as a fulcrum. A scale is placed upon the bed plate in position to indicate the distance of this fulcrum from the pin 16 in the free end of the reed or the length of reed free to vibrate. In Fig. 1 the fulcrum is shown by the scale as being located two inches from the free end of the reed. It will be understood, of course, that the portion of the reed between the ears 12 and the clamping jaws 17 is maintained stationary while the portion of the reed extending to the right of the clamping jaws 17 is free to vibrate transversely above the bed plate. The carriage 18 is also provided with a vertical clamping screw having a nut operated by the clamping arm 22 whereby the carriage may be clamped rigidly to the bed plate in any adjusted position determined by turning the feed screw 19.

The free end of the reed 14 is surrounded with clearance by a bracket 25 shaped like an inverted U and provided with a horizontal partition extending transversely above the upper edge surface of the reed. A mirror 26 is mounted to oscillate about the vertical axis of a spindle set in this partition. The mirror is operatively connected with the free end of the reed and in the device herein shown this connection is effected by an angular arm 27 which extends from the mirror spindle toward the right and downwardly into forked engagement with the upstanding pin 16. Accordingly, the vibration of the free end of the reed is transmitted to the mirror 26 as an oscillatory and angularly magnified movement. Lost motion in the mirror and its operative connection is taken up by a U-shaped spring 28 fast at its outer end to one side of the bracket 25.

A lamp housing 30 provided with a cylindrical concentrating lens 32 is mounted at one side of the bed plate in a position to direct a beam of light upon the mirror 26 from such an angle that the reflected beam is directed toward the left in a path substantially parallel to and above the reed 14. At its left-hand end the bed plate is provided with a graduated scale 33 having its zero mark in substantial alignment with the reed and being graduated outwardly both ways from its zero mark. It will be apparent, therefore, that the beam reflected by the mirror 26 will itself be vibrated transversely upon the scale 33 and that its amplitude will depend upon the amplitude of vibration of the reed 14.

The light housing 30 is provided with projecting veins or ribs 31 which act as radiators to keep the temperature of the housing within convenient limits.

The device as herein illustrated is organized to clamp in position for investigating the motor of a dry shaving implement such as that indicated by dotted lines in Fig. 1. To this end, the bed plate is provided with a pair of transversely movable clamping members 37, each having a notch to receive one corner of the motor and each having an adjusting screw 36 which is threaded into a fixed bracket 35 upon the bed plate. The two adjusting screws 36 may be manipulated to clamp the forward end of the motor between them and they may be also jointly shifted transversely of the bed plate to locate the motor in an initial position wherein the mirror 26 will direct the reflected beam to the zero point of the scale 33. The clamping members 37 are referred to hereinafter as means for adjustably retaining the motor to be tested in position with its driven member connected to the free end of the reed. The operative connection between the driven member of the motor and the reed may be effected by the forked head 15, or in accordance with the construction of the motor itself. As herein shown, particularly in Fig. 4, the driven member of the motor includes an arm which extends into the opening of the forked head 15.

The other end of the motor is clamped in place by a swinging clamping member 38 pivotally mounted near the right-hand end of the bed plate and threaded to receive a clamping screw 39 which at its inner end butts against a stationary stop member 40 screwed to the face of the bed plate.

In testing a vibratory motor with the assistance of the device above described the motor is first clamped rigidly in position by manipulating the clamping screws 36 and 39 and in this clamping and adjusting operation the initial position of the reflected beam representing the free position of the reed is brought to zero on the scale 33 as already explained. The carriage 18 is then adjusted for an effective reed length, for example, one inch, and the clamping screws 21 and 22 turned to clamp the reed fulcrum in that position. The motor is now set in motion and, the lamp in the housing 30 having been illuminated, there will now be seen on the scale 33 a luminous band indicating reed movement of .020". The load on the motor may be increased by moving the fulcrum toward the right and so shortening the portion of the reed which is free to vibrate, or the load may be decreased by moving the fulcrum toward the left and increasing the length of the vibrating reed. The width of the light beam on the scale 33 will vary accordingly.

The motor characteristics which may be determined by using the testing device herein disclosed are indicated in Fig. 5. In this diagram the horizontal ordinate indicates length of vibrating reed in inches, that is to say, the dimension indicated on the scale in Figs. 1 and 3. Upon the vertical ordinate is indicated by different scales, arm movement or amplitude of the reed, and the energy in watts consumed by the motor being tested. The power curve indicates that the energy requirement of the motor falls off as the effective length of the reed is increased until at a length of about 2⅛" the energy consumption has dropped to approximately 3.1 watts corresponding to the normal power required to overcome friction and keep the motor vibrating when relieved of the load of the cutter. When the cutter is connected to the vibrating member of the motor a total energy requirement of four watts is indicated. The curve marked "Arm movement" indicates the increasing amplitude of reed vibration as the length of the reed is increased by shifting the fulcrum. In the particular motor being tested frictional restraining means are provided which become effective at an amplitude of vibration of approximately .042. The full line curve indicates the fact that amplitude of vibration is held substantially constant from this point outwardly, while the dotted line curve indicates what the vibration would be if unrestrained. A dotted line corresponding to approximately 4.4 watts indicates consumption of energy required by the motor under shaving load. It will be apparent, therefore, that by shifting the fulcrum point of the reed in the testing device a comprehensive study may be made of any motor under investigation throughout a wide range of different loads and in this way the performance and characteristics of the motor may be checked and compared to the performance and characteristics of a standard motor.

Various types and designs of cutters require varying amounts of movement for operation at maximum efficiency. In the case of the Gillette dry shaver cutter a movement of the tooth pitch plus the width of tooth on the inside cutter is required in order to have the slots open at the end of each stroke to permit the hair to enter and to be cut effectively. The actual movement required in this case is .040″–.045″ and the motor must furnish sufficient power at the cutter over this range of movement to operate effectively and without stalling.

It is an inherent characteristic of most all types of vibrator motors to deliver power to the cutter arm in a varying amount over the range of any given arm movement by virtue of the fact that the magnetic power impulse is undirectional and the power varies greatly as the gap between the armature and field varies, being most powerful as the gap diminishes. It is, therefore, necessary to employ means for distributing the power over or throughout the arm movement required for effective operation. This is accomplished in the Gillette vibrator motor by a combination of spring and rubber buffer action, disclosed and claimed in application Serial No. 305,737, filed November 22, 1937, by Harry Stoney.

Motors of the universal rotary or contact type employing a crank to obtain the desired amount of cutter movement, deliver power to the cutter uniformly, within the power limits of the motor over the arm movement.

The arm movement on motors of this type being predetermined by the crank throw, the investigation of stroke power relation is not necessary as with the vibratory type motor. However, the testing device may be used in connection with these motors to ascertain the amount of mechanical power delivered, its electrical and mechanical efficiency and uniformity in manufactured motors. The power of various types and makes may also be compared and power standards can be readily established.

Having thus disclosed my invention and described a preferred embodiment thereof for purposes of illustration but not by way of limitation, I claim as new and desire to secure by Letters Patent:

1. A motor testing device including a bed plate, a vibratory reed anchored at one end thereof to the bed plate with the other end free to vibrate, an adjustable fulcrum movable on the bed plate along the reed, means for adjusting the position of the fulcrum, calibrated means on the bed plate to determine the free length of the reed, an oscillatory mirror mounted adjacent to the reed and having operating connections with a vibratory part thereof, a light source arranged to direct a light beam to said mirror, and a scale for indicating the amplitude of vibration of the reflected light beam.

2. A motor testing device including in its structure a bed plate, a vibratory reed anchored at one end to the bed plate with the other end free to vibrate, a movable fulcrum adjustable along the reed, means for clamping a motor in position with its driven member operatively connected to the free end of the reed, means for adjustably determining the position of the fulcrum of the reed, which means are operative while the reed is in a state of vibration, a scale, and optical means for indicating thereon the amplitude of reed vibration.

3. A motor testing device including a supporting frame, a vibratory reed secured at one end to the frame, an oscillatory mirror connected to a vibratory part thereof, a source of light arranged to direct a light beam to the mirror, a scale located in position to receive the light beam reflected from the mirror, and means for clamping the motor to be tested in position to engage the reed with its driven member, said clamping means including provision for adjustment to position the mirror so as to direct the light beam initially to a selected position of said scale.

4. A motor testing device including a vibratory reed clamped at one end, free to vibrate at the other and having a longitudinally adjustable fulcrum member located between its ends, transversely adjustable motor clamps adjacent to the free end of the reed, an oscillatory mirror mounted above the free end of the reed and connected with a vibratory part thereof, a light source arranged to direct a light beam to said mirror in such direction that the beam is reflected by the mirror in a path substantially parallel to the reed, and a scale located beyond the clamped end of the reed in position to receive the reflected beam.

5. A motor testing device including a base, a reed mounted on the base with one end free for vibration, a bracket on the base embracing the free end of the reed with clearance and having a partition above the reed, an oscillatory mirror mounted on said partition and having a forked operating arm extending downwardly into connection with a vibratory part of said reed, a light source associated with the mirror, a scale in range of the beam reflected thereby, and means for holding a motor operatively connected to said reed.

6. A testing device for vibratory electrical motors, including a bed plate, a reed mounted thereon to vibrate horizontally above the bed plate, a fulcrum member adjustable longitudinally of the reed, means carried by the bed plate for clamping a motor to be tested in stationary position thereon and in contact with said reed, and means for visually indicating the amplitude of reed vibration imparted thereto by the motor.

7. A testing device for vibratory electrical motors, including a bed plate, a reed mounted to vibrate transversely at one end above the bed plate, opposed motor clamps mounted on the bed plate adjacent to the vibrating end of the reed to hold a vibratory part of the motor in operating relation with the reed, a fulcrum member for the reed adjustable longitudinally thereof while the motor connection remains undisturbed, and means for indicating the amplitude of reed vibration imparted thereto by the motor.

JOHN A. HANLEY.